July 11, 1939.  D. VAN DER M. HAARHOFF  2,165,955
WEAR-RESISTANT SURFACE
Filed Feb. 23, 1939
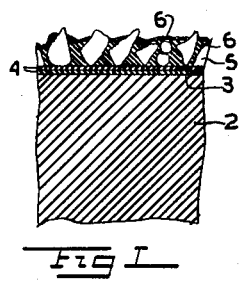
Fig. I
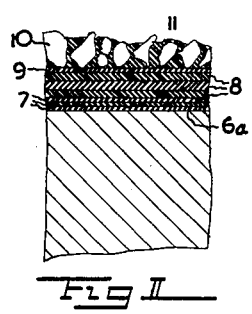
Fig. II
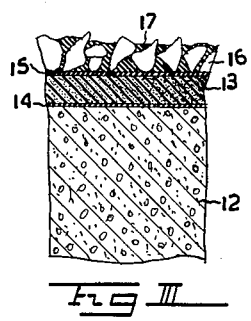
Fig. III
Inventor:
Daniel Van Der Merwe Haarhoff
By Young Curry & Thompson
Attorneys Patented July 11, 1939

2,165,955

UNITED STATES PATENT OFFICE 2,165,955

WEAR-RESISTANT SURFACE

Daniel van der Merwe Haarhoff, Alberton, Union of South Africa, assignor to Anti-Abradants (Proprietary) Limited, Johannesburg, Union of South Africa Application February 23, 1939, Serial No. 258,112
In the Union of South Africa December 18, 1937

6 Claims. (Cl. 91—68)

The object of the present invention is to provide rubber and other articles with surfaces which are highly resistant to wear.

According to the invention wear-resistant surfaces of articles are provided by a composition which comprises hard and tough wear-resistant granular material bonded by or to rubber.

The wear-resistant material may consist, for example, of emery, carborundum, corundum, flint, bauxite, carbides, silicides and like natural or synthetic substances of a hard and tough character which are commonly used as abrasives. The optimum size of the grains of the granular material differs with the purpose for which the product is to be used. Material passing a 40 mesh per square inch sieve was found satisfactory in a product used for covering the working surfaces of some types of machinery. For other purposes material passing an 80 mesh and even material passing a 120 mesh sieve was successfully used. The size of the grains is not critical and the best size for each purpose can readily be found by experiment.

It appears that in the composition of the invention the hard and tough material covers and shields the rubber and thus decreases to a substantial extent wear of the rubber; whilst the elasticity of the rubber bond decreases to a substantial extent wear of the hard material as it permits the hard particles to recede when exposed to the pressure of a wear-producing body and thus to diminish the abrasive force acting upon them and thereupon to return to their original positions; and it has been proved that the composition of the invention wears off, under the same conditions, at a very considerably slower rate than coatings consisting of rubber or coatings consisting of hard and tough wear-resistant material without an elastic rubber bond.

A composition according to the invention may be formed by methods well known in the rubber industry, into finished articles. To produce, for example, a rubber tyre embodying the invention, grains of the wear-resistant material are incorporated in the tread portion of the tyre before vulcanization so as to form an integral part of the final vulcanized tyre. A further example of a finished article which may be produced in the same manner is a rubber sheet containing wear-resistant granular material throughout its body or only in its surface layers. The composition may contain, for example, 20%–50%, by weight, of granular material.

A very important use of the composition of the invention is the protection of surfaces of preformed articles which are subjected to abrasion and which may consist of rubber or any other material. Such surfaces may be protected by covering them with a preformed sheet of rubber at least the surface of which consists of the afore-described composition. However, sheets are sometimes difficult to secure to the surface to be protected, particularly if the latter is irregular and a very important advantage of the invention is that it permits of building up in situ a protective covering firmly bonded to the surface on any kind of surface, whatever its material and shape, and without the necessity of heating such surface or applying pressure.

Accordingly, the invention also comprises a method for protecting a surface subjected to abrasion, which consists in building up on such surface with the use of plastic and/or liquid material a surface coating comprising hard and tough granular wear-resistant material bonded to or by rubber.

The best manner of carrying out this method will depend on the nature of surface which is to be coated, on the intended thickness of the wear-resistant surface layer and on other factors, and may be varied in its details to suit any particular case.

In its preferred form, the method comprises the steps of coating the surface to be protected with at least one thin coat of a primer solution which provides, on evaporation of the solvent, a firm bond between metal and rubber and which preferably itself comprises rubber; applying to the resulting thin coat, while it is still in an adhesive condition, one or more coats of a solution containing cold vulcanizing rubber; applying a coat of primer solution on to the rubber coat or on to the last rubber coat while the latter is still in an adhesive condition; sprinkling the granular material on to the primer coat, and applying to the granular material, preferably immediately, a further coat of primer solution, the last two primer coats providing, upon evaporation of the solvent, a firm bond between the rubber coats and the granular material.

The thickness of the protective layer may be increased by increasing the number of rubber and/or primer coats and also, if desired, the number of coats of granular material.

Before the application of the first primer coat the surface should be thoroughly cleaned as by sandblasting. If the surface consist of a copper alloy, such as bronze, it is preferred to coat it with a thin layer of pure iron or other ferrous metal, as by spraying; and to apply the protective surface layer in the aforesaid manner to the iron coating.

The term "solution containing cold vulcanizing rubber" is intended to mean throughout the specification and claims a solution which, upon evaporation of the solvent, leaves a coating comprising solid rubber which is either fully vulcanized or vulcanizes by itself within a short time without artificial application of heat.

Such solutions generally comprise rubber, sulphur, a vulcanizing agent with or without an accelerator and fillers, and may be of the latex or of the benzol type. The manner of compounding such solutions so as to produce grades of rubber differing in elasticity, hardness and the like is well known in the art. For example, a latex solution suitable to yield, on evaporation of the water, a very tough and highly resilient rubber may comprise about 50% of rubber, 3% sulphur, 3% zinc oxide and an ultra-accelerator. Rubber solutions which are particularly suitable are marketed under the trade names "Airvulc Liquid Rubber", "Selfvulc Plastic Rubber" and "Airvulc Plastic Rubber".

Primer solutions are equally well known and may comprise natural or artificial resins, chlorinated rubber or rubber derivatives of resinous character, bitumen or the like, with or without rubber and suitable curing agents. Suitable primers are marketed, for example, under the trade names "Selfvulc 'M' Primer" and "Malacca 101 Primer".

In another form the method of the invention comprises the steps of mixing a solution containing e. g. about 40% of cold vulcanizing rubber (or cold vulcanizing plastic rubber) with the granular material in, for example, equal volumes, applying the resulting mixture to the surface, which is previously coated with primer, and coating the thus produced surface, while it is still in adhesive condition, with a coat of primer solution. This manner of applying the protective coating is particularly suitable when coatings of greater thickness are desirable.

In another way of carrying out the method of the invention, non-self-vulcanizing rubber solutions are used and the coats are vulcanized by exposing them to sulphur chloride or in a similar manner. These solutions may be used, except for the vulcanization step, in substantially the same way as aforedescribed in connection with cold-vulcanizing rubber solutions.

The rubber solutions may be applied by painting, spraying, dipping or in any other known manner suitable for the purpose of the invention.

For attaining a high degree of resistance against abrasion it is essential that the grains of the wear-resistant material be evenly distributed and be spaced from one another and that each grain be elastically cushioned by the rubber.

In a further way of carrying out the invention, a sheet of rubber, and preferably of sponge rubber, is secured to the surface which is to be protected in the customary manner, as by gluing it on with a primer solution. Thereupon at least one coat of primer solution is applied to the surface of the rubber sheet and hard and tough wear-resistant granular material is sprinkled on to said coat while it is in adhesive condition. Finally, one or more coats of primer solution is or are applied to the layer of wear-resistant material so as to bond it firmly to the rubber sheet.

The term "rubber" is intended to include rubber and similar substances suitable to constitute a rubber-like highly resilient, tough, bonding material.

The invention will be further described with reference to the accompanying drawing in which:

Figure I shows the protective layer of the invention applied to a rubber surface;

Figure II shows a similar layer applied to a metal surface;

Figure III illustrates a protective layer comprising sponge rubber and applied to a concrete surface.

In order to show clearly the very thin separate layers of which the protective layer is formed, the figures are drawn on a large scale.

With reference to Figure I, 2 indicates a piece of an article consisting of cured rubber, for example a rubber sheet. In applying the method of the invention to the production of a protective coating on such a rubber article, its surface 3 is thoroughly cleaned, if necessary roughened, and is given a suitable number (in the example shown, two) of coatings 4 of primer solution. The granular wear-resistant material 5 is then sprinkled on to the outermost coating 4 whilst the latter is in an adhesive condition. After said coating 4 has solidified, one or more primer coating 6 are applied on top of the wear-resistant material 5.

In applying the method of the invention to the production of protective coatings on metal surfaces, the surface 6 (Figure II) of the metal article is first cleaned with petrol, benzine or other cleansing agent or by sandblasting. The clean metal surface 6 is then given three coats 7 of a primer solution, about an hour being allowed between the application of each two successive coats to permit them to set. The surface is then given three coats 8 of a solution containing cold-vulcanizing rubber. Each coat is allowed to set before the next is applied, about 2½ hours being usually sufficient. Thereupon a coat 9 of primer solution is applied to the last rubber coat 8 and granular material 10 is sprinkled on to said coat 9 whilst the latter is still in an adhesive condition. Finally a further coat 11 of primer solution is applied on top of the granular material 10 in order to provide a firm bond between the rubber and the granular material.

In Figure III, 12 indicates a portion of a concrete article, for example, a piece of a concrete slab. A thin sheet 13 of sponge rubber is secured to the surface of 12 as by a layer 14 of primer solution; and a coat 15 of primer wear-resistant granular material 16, and a further coat 17 of primer solution are applied to the surface of the sponge rubber sheet substantially as described with reference to Figure II.

I claim:

1. An article having a wear-resistant composite surface comprising at least one layer of rubber primer, at least one layer of vulcanized sponge rubber on top of said primer, at least one further layer of rubber primer on top of said sponge rubber, at least one layer of grains of a hard and tough wear-resistant material on top of said further rubber primer layer, and at least a third rubber primer layer on top of said wear-resistant material.

2. A method of protecting a surface subjected to abrasion, comprising the steps of securing to said surface a coating of vulcanized rubber, applying to said rubber coating at least one coat of rubber primer solution, sprinkling the surface of the outermost coat with hard and tough wear-resistant granular material, whilst the latter is still in an adhesive condition, and applying at least one more coat of rubber primer solution to said wear-resistant material.

3. A method of protecting a surface subjected to abrasion, comprising the steps of securing to said surface a coating of vulcanized sponge rubber, applying to said rubber coating at least one coat of rubber primer solution, sprinkling the surface of the outermost coat with hard and tough wear-resistant granular material, whilst the latter is still in an adhesive condition, and applying at least one more coat of rubber primer solution to said wear-resistant material.

4. A method of protecting concrete, comprising the steps of securing to the surface of said concrete a coating of vulcanized sponge rubber, applying to said rubber coating at least one coat of rubber primer solution, sprinkling the surface of the outermost coat with hard and tough wear-resistant granular material, while the latter is still in an adhesive condition, and applying at least one more coat of rubber primer solution to said wear-resistant material.

5. An article having a wear-resistant composite surface comprising a layer of vulcanized sponge rubber secured to the article, a layer of rubber primer on top of the sponge rubber, at least one layer of grains of hard and tough wear-resistant material on top of said rubber primer layer, and another rubber primer layer on top of said wear-resistant material.

6. A method of protecting a surface subjected to abrasion, comprising the steps of applying to said surface at least one layer of rubber primer, applying a coating of vulcanized sponge rubber on top of said primer, applying at least one layer of rubber primer to said sponge rubber, sprinkling the surface of the outermost coat with hard and tough wear-resistant granular material, while the latter is still in an adhesive condition, and applying at least one more coat of rubber primer solution to said wear-resistant material.

DANIEL van der MERWE HAARHOFF.